Oct. 31, 1967   G. E. APPLE   3,350,043
TREE STAND

Filed July 21, 1965   2 Sheets-Sheet 1

INVENTOR.
GAROLD E. APPLE
BY M. A. Hobbs
ATTORNEY

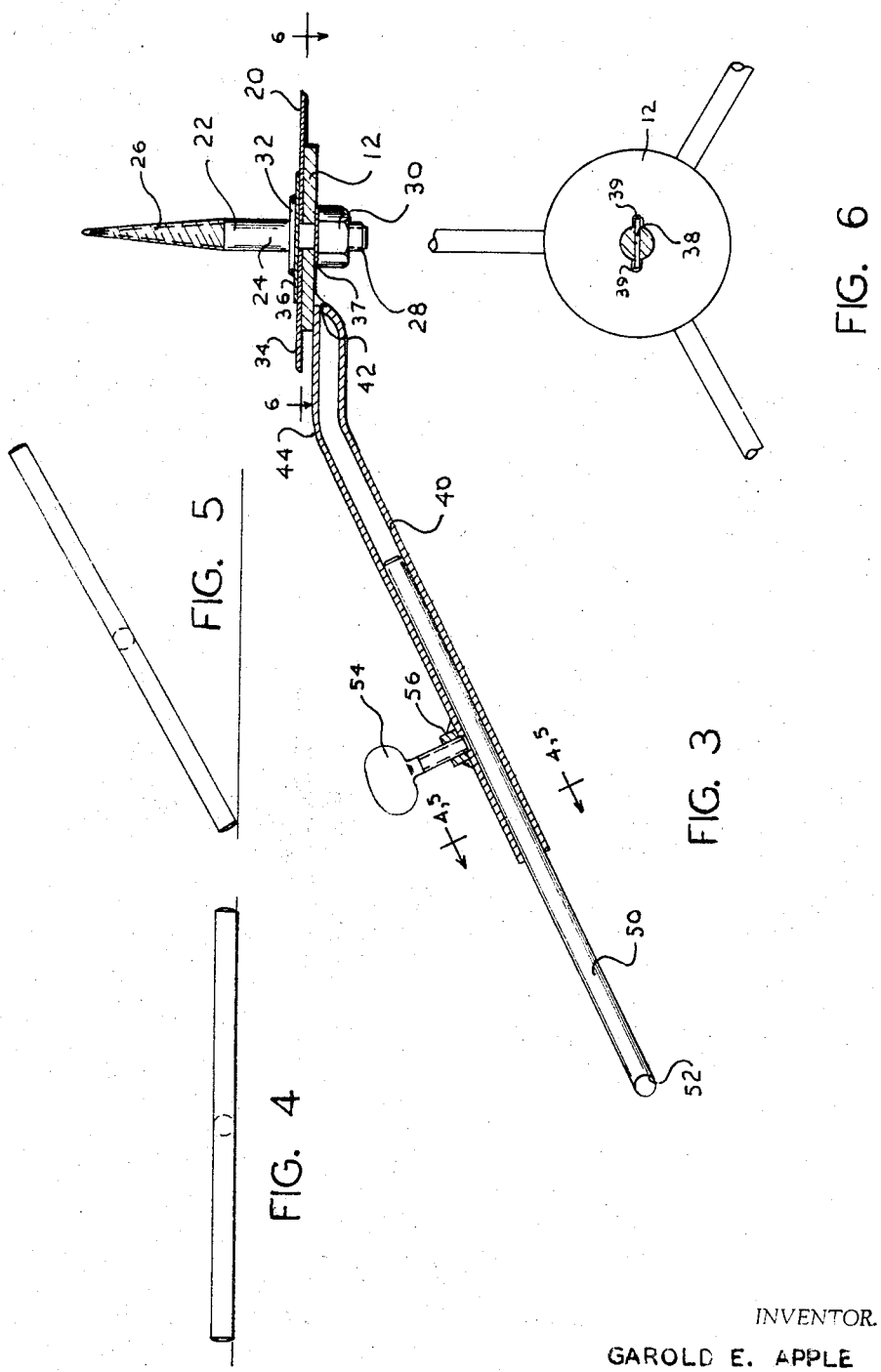

United States Patent Office
3,350,043
Patented Oct. 31, 1967

3,350,043
TREE STAND
Garold E. Apple, R.R. 4, Plymouth, Ind. 46563
Filed July 21, 1965, Ser. No. 473,732
5 Claims. (Cl. 248—48)

ABSTRACT OF THE DISCLOSURE

A stand for a Christmas tree having a stud or other means in the center for holding the tree in an upright position and three laterally extending legs, each leg having an inner and outer telescopic part. A cross member is secured to and extends laterally from the outer telescopic part and is rotatable relative to the inner telescopic part to assist in adjusting the tree in upright position.

In placing Christmas trees in the home, school and in other indoor places, the tree trunk must be firmly held at its base and the lower end of the trunk placed in water to keep the tree foliage with a fresh appearance. A variety of different types of stands and holders have been used and tried, but most of these prior devices have had one or more inherent difficulties which rendered them unsatisfactory or inconvenient, or they were too expensive and/or complicated to operate to be available or practical for the average home use. These include the difficulty of securing the stand or base firmly to the trunk of the tree, often requiring truing the lower end of the trunk and clamping the sides of the trunk with a plurality of set screws or the like. After the stand has been secured to the lower end of the trunk, the tree often leans to one side or the other, detracting from the appearance of the decorated tree and creating a hazard from the possibility of tilting over, including the likelihood of injuring someone and creating a mess from water spilled from the container at the bottom of the trunk. To correct this condition in the past with the conventional stand, the bottom of the trunk had to be trued and/or the tree reset in the stand and the screws tightened, the latter often being unsuccessful and difficult. It is therefore one of the principal objects of the present invention to provide a tree stand which will hold the tree firmly with the base of the tree trunk in a container of water, and which can be easily and effectively adjusted to place the trunk of the tree in a true vertical position.

Another object of the invention is to provide a tree stand which can readily be secured to the base of the trunk with the trunk in a substantially vertical position, regardless of whether or not the bottom of the trunk is cut to a true horizontal, and which permits adjustment over a wide range to place the trunk accurately in vertical position.

Still another object is to provide a relatively simple Christmas tree stand which can be easily manipulated to secure it to the bottom of the tree, and which will remain firmly attached thereto while in use, and which can readily and conveniently be removed from the tree when the tree is to be discarded.

A further object of the invention is to provide a tree stand of the aforesaid type which provides effective means for water to be easily added from time to time to the container therefor, and for water to be fed to the trunk throughout the time the tree is being used.

Another object of the invention is to provide a Christmas tree stand which can easily be fabricated from standard material without the use of any special tools or equipment, and which can be easily assembled for use without any tools, and which can readily be disassembled into a compact package for storage.

Additional objects and advantages of the invention will become apparent from the following description and accompanying drawings, wherein:

FIGURE 3 is an enlarged fragmentary cross sectional view taken on line 3—3 of FIGURE 1;

FIGURE 4 is a cross sectional view of a portion of one leg of the present stand showing the foot of the leg in one position, the section being taken on line 4—4 of FIGURE 3;

FIGURE 5 is a cross sectional view similar to that shown in FIGURE 4 taken on line 5—5 of FIGURE 3, showing the foot in a different position from that of FIGURE 4; and FIGURE 6 is a cross sectional view taken on line 6—6 of FIGURE 3.

Figure 1:
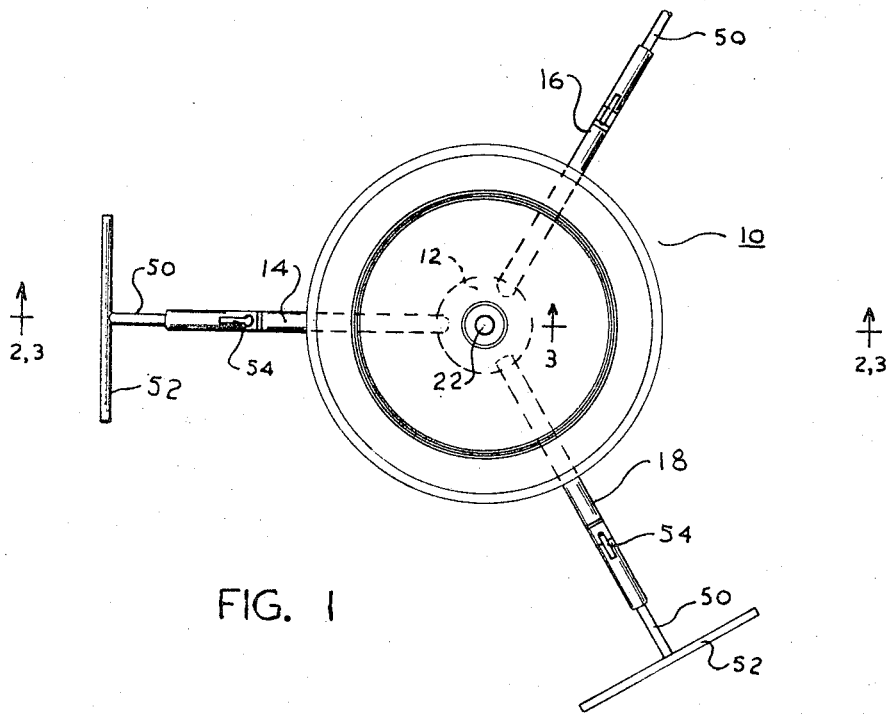
FIGURE 1 is a top plan view of the stand.
Figure 2:
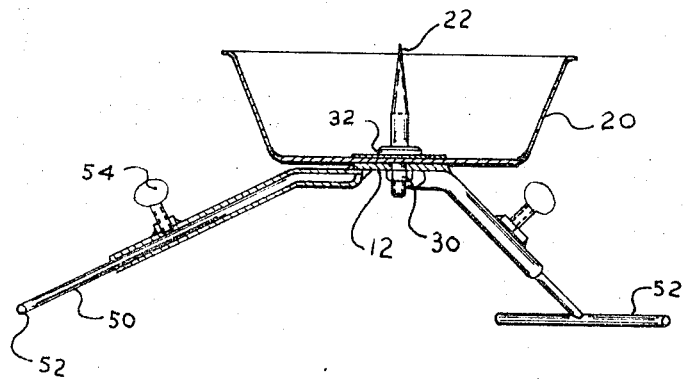
FIGURE 2 is a vertical cross sectional view of the stand shown in FIGURE 1, the section being taken on line 2—2 of FIGURE 1.

Referring more specifically to the drawings, numeral 10 designates the present tree stand which is intended primarily for use in mounting Christmas trees in homes and other indoor places. The present stand will handle a variety of different types of Christmas trees, both artificial and natural evergreen trees, and will effectively hold trees over a wide range of sizes.

The tree stand consists of a disc-shaped base plate 12, having three legs 14, 16 and 18 secured thereto and projecting radially therefrom, and a water container 20 and tree holder 22. The tree holder consists of a stud 24 having a pointed upper end 26 with threads extending throughout its length and a downwardly extending shaft 28 for receiving a nut 30. A collar 32 formed integrally with the stud is provided at the upper end of the threaded shaft 28 and is adapted to seat firmly on the upper side of the bottom 34 of pan 20. A washer 36 for forming a fluid-tight seal between collar 32 and pan bottom 34 is preferably inserted on shaft 28 against the underside of collar 32. When nut 30 is tightened on shaft 28 until it seats firmly against the underside of base 12, a fluid-tight joint is formed between the collar and pan, thus preventing leakage after the stand has been fully assembled. A lock washer 37 is preferably inserted between nut 30 and the lower side of base 12 to hold the nut firmly tightened on shaft 28. Pan 20 may be of various sizes and shapes and may be varied in size from one stand to another, depending upon the quantity of water desired for any particular tree. In order to prevent stud 24 from turning relative to base 12, an interlocking pin 38 extending through the stud seats in opposed slots 39 in the base.

Each leg 14, 16 and 18 consists of an upper tubular section 40 welded at numeral 42 to the underside of base 12 and is thereby rigidly held in a radially outwardly extending position. The tubular section is curved downwardly at numeral 44, which assists in adjusting the leg in the manner to be described hereinafter. A shaft 50 is inserted into the hollow interior of tube 40 from the lower end thereof and has a cross member 52 secured to its lower end forming a T-shaped configuration. Shaft 50 is movable longitudinally in tubular section 40, both axially and rotatably, and is held in its adjusted position by a set screw 54 threadedly received in a boss 56 secured to the upper side of tubular section 40. It is seen that shaft 50 may be moved outwardly and rotated in making the adjustment and after the adjustment has been made, held firmly in place by set screw 54.

In the use of the present tree stand, the parts are assembled in the manner illustrated in the drawings, and a tree to be mounted in the stand is preferably lying on its side with the trunk easily accessible. With the type of stud illustrated in the drawings, the sharp end of the stud is pressed into the tree and the stand rotated. The rotation of the stand forces the stud into the bottom of the tree until the bottom surface of the tree is seated on the upper side of collar 32 and/or on the upper side of bottom 34 of pan 20. With this type of securing means, it is not necessary to have the bottom of the tree cut on the horizontal plane, but it may be angular, thus exposing an enlarged area for absorption of water from the pan. In order to facilitate insertion of stud 22, a small hole may be drilled in the bottom of the trunk and this hole may be varied in size from a small pilot or guide hole to one substantially as large as the largest diameter of the stud. However, the stud will seat itself effectively if no hole is first drilled in the bottom of the trunk.

After the tree and stand have been uprighted, if the trunk is not positioned vertically, this out of alignment can be readily corrected by merely loosening the set screw 54 on the leg toward which the trunk is leaning, and thereafter sliding the shafts 50 downwardly in angularly positioned section 40 to raise the respective side of the stand. Shifting the shaft downwardly only a short distance normally will correct an off-vertical position of the trunk. Instead of shifting the shaft of the leg on the side toward which the trunk is leaning, the shaft on one or two of the legs opposite the inclination of the tree may be moved by slipping the shafts inwardly to decrease the length of the leg or legs and thereby tilt the trunk toward that side until it is in the erect position. By using the correct procedure, any one of the three legs can be readily adjusted to properly position the tree.

Another advantage of the present structure is that adjustment can be effectively made even in close places where the floor area is restricted, such as for example, on a small platform. This can be accomplished by merely rotating shaft 50 and cocking the respective cross member 52 at an angle, thereby raising the respective leg and side of the stand to tilt the tree in the direction away therefrom. After the adjustment is made, the set screw 54 is tightened sufficiently to hold shaft 50 firmly in its adjusted position. Normally, the adjustment of only one leg is required to upright the tree into exactly vertical position; however, the adjustment of two legs may sometimes be required. After the tree has been uprighted and adjusted to the correct vertical position, the pan is filled with water to maintain the tree in a fresh condition. The tilting of the stand to upright the tree to a vertical position is not sufficient to substantially decrease the quantity of water which the pan can safely hold.

The present leg adjustment mechanism can be used successfully with other types of tree securing means in place of stud 22 or other water containers in place of pan 20, and more than three legs may be used, if desired, although three, because of the tripod arrangement, are preferable.

While only one embodiment of the tree stand has been described in detail herein, various changes and modifications may be made without departing from the scope of the invention.

I claim:

1. A stand for Christmas trees and the like, comprising a disc-shaped base with a center hole, a stud extending through said hole and having an upper pointed and threaded end and a lower threaded end, a collar between said ends on the upper side of said base, a water container having a bottom disposed between said collar and base, a seal between said container bottom and collar, three generally radially positioned legs extending angularly downwardly therefrom, each leg having a tubular section connected to said base and a lower section telescopically arranged with respect to said upper section, a cross member on the lower end of said lower section, and a set screw in said tubular section for releasably holding said sections in adjusted positions with respect to one another against both axial and rotative motion.

2. A stand for Christmas trees and the like, comprising a base with a center hole, a stud extending through said hole and having an upper threaded end and a lower threaded end, a water container on said base, a plurality of generally radially positioned legs extending angularly downwardly therefrom, each leg having a tubular section connected to said base and a lower section telescopically arranged with respect to said upper section, a laterally extending member on the lower end of said section, and a securing means for releasably holding said sections in adjusted positions with respect to one another against both axial and rotative motion.

3. A stand for Christmas trees and the like, comprising a base, a means for holding a tree, three generally radially positioned legs extending angularly downwardly therefrom, each leg having a tubular section connected to said base and a lower section telescopically arranged with respect to said upper section and rotatable therein, an elongated cross member rigidly mounted on the lower end of said lower section, and a set screw in said tubular section for releasably holding said sections in adjusted positions with respect to one another against both axial and rotative motion.

4. A stand for Christmas trees and the like, comprising a base, a means for holding a tree, a plurality of generally radially positioned legs extending angularly downwardly therefrom, each leg having a tubular section connected to said base and a rotatable lower section telescopically arranged with respect to said upper section, an elongated laterally extending member rigidly mounted on the lower end of said lower section, and a securing means for releasably holding said sections in adjusted positions with respect to one another against both axial and rotative motion.

5. A stand for Christmas trees and the like, comprising a base, a means for holding a tree, three generally radially extending legs, each leg having a tubular section connected to said base and a rotatable section telescopically arranged with respect to said first section, an elongated transverse member rigidly mounted on the free end of said second section, and a securing means for releasably holding said sections in adjusted positions with respect to one another against both axial and rotative motion.

References Cited

UNITED STATES PATENTS

| | | | |
|---|---|---|---|
| 2,684,109 | 7/1954 | Youmans | 272—32 |
| 2,944,354 | 7/1960 | Sellon | 38—121 |
| 3,142,464 | 7/1964 | Zelenitz | 248—48 |
| 3,272,462 | 9/1966 | Apple | 248—44 |

ROY D. FRAZIER, *Primary Examiner.*

K. J. WINGERT, *Assistant Examiner.*